S. Barry,
Saw Teeth.
№ 79,099. Patented June 23, 1868.
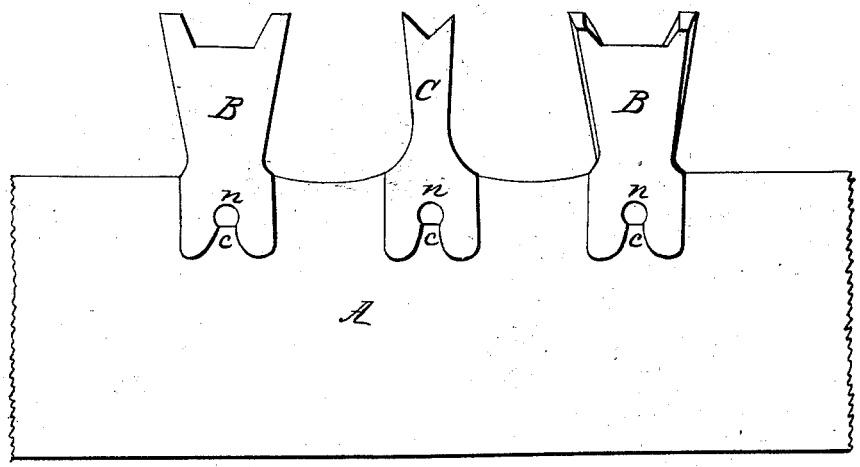
Witnesses:
Barton Pickering
Thos. D. Mitchell
Inventor:
Samuel Barry

United States Patent Office.

SAMUEL BARRY, OF DAYTON, OHIO.

Letters Patent No. 79,099, dated June 23, 1868.

IMPROVEMENT IN SAWS.

*The Schedule referred to in these Letters Patent and making part of the same.*

TO ALL WHOM IT MAY CONCERN:

Be it known that I, SAMUEL BARRY, of Dayton, in the county of Montgomery, in the State of Ohio, have invented a new and improved Saw; and I do hereby declare that the following is a full and exact description thereof, reference being had to the accompanying drawing, and to the letters of reference marked thereon.

The nature of my invention consists of the means used for attaching removable teeth to a saw-plate.

To enable others skilled in the art to make and use my invention, I will proceed to describe its construction and operation.

The figure represents a side view of the saw.

A represents a saw-blade, having an aperture, of the form shown in the drawing, for the reception of the teeth. The teeth have an angular groove in their sides, into which the sides of the aperture enter as the teeth are driven or forced into position.

The sides of the aperture are at a right angle with the edge of the blade to a point on a line with the top of the projection $c$, and from thence back there is a slight inclination outward to the curve at the base, the backs of the teeth B and C being forked, or their ends divided. As the teeth are being forced in, the projection $c$ bends the forked parts outward, and thereby secures the teeth firmly in position. The tooth C is thicker at its edge, and slightly shorter than the cutting-teeth, which are set so that the clearing-tooth passes freely within the cut of the saw.

Each of the cutting-teeth has two cutting-edges, and is dressed as shown at the right-hand tooth. The cutting-teeth are identical in form, and are arranged in a reverse order as to their cutting-edges. To remove the teeth, a tapering key is driven in the orifice at $n$.

I would not be understood as confining myself to the precise form and size of aperture and teeth herein described, nor to limit my improvements to a cross-cut saw, as the invention is applicable to circular and rip-saws, the cutting-edges being modified to suit the requisite conditions.

What I claim as my invention, and desire to secure by Letters Patent, is—

The mode of attaching the teeth B and C to the saw-plate A, substantially as shown and described.

SAMUEL BARRY.

Witnesses:
BARTON PICKERING,
THOS. D. MITCHELL.